United States Patent
Poznanski et al.

(10) Patent No.: US 6,360,196 B1
(45) Date of Patent: *Mar. 19, 2002

(54) METHOD OF AND APPARATUS FOR RETRIEVING INFORMATION AND STORAGE MEDIUM

(75) Inventors: Victor Poznanski, Sandford on Thames; Jan Jaap Ijdens, Gloucester Green, both of (GB)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/313,449

(22) Filed: May 18, 1999

(30) Foreign Application Priority Data

May 20, 1998 (GB) ............................................. 9810795

(51) Int. Cl.⁷ ........................... G06F 17/28; G06F 17/20
(52) U.S. Cl. ................................ 704/8; 704/3; 707/536
(58) Field of Search ........................ 704/2–8; 707/530, 707/536, 2–6

(56) References Cited

U.S. PATENT DOCUMENTS

| | | | | |
|---|---|---|---|---|
| 5,541,837 A | * | 7/1996 | Fushimoto | 704/2 |
| 5,956,740 A | * | 9/1999 | Nosohara | 707/536 |
| 6,006,221 A | * | 12/1999 | Liddy et al. | 707/5 |
| 6,064,951 A | * | 5/2000 | Park et al. | 704/5 |

FOREIGN PATENT DOCUMENTS

| | | |
|---|---|---|
| GB | 2 320 773 A | 10/1996 |
| WO | WO97/08604 A2 | 3/1997 |
| WO | WO97/18516 A1 | 5/1997 |

OTHER PUBLICATIONS

UK Search Report Dated Nov. 4, 1998.

UK Search Report Dated Nov. 4, 1998.

* cited by examiner

*Primary Examiner*—Patrick N. Edouard
(74) *Attorney, Agent, or Firm*—Renner, Otto, Boisselle & Sklar

(57) ABSTRACT

A method of retrieving information from a plurality of documents in a target language using a query in a source language, includes the steps of converting the query into the target language using a multilingual resource, forming a query in the target language from the converted query, applying the query in the target language to an information management system, and converting at least part of the or each document in the target language identified by the information management system into the source language using the multilingual resource.

22 Claims, 3 Drawing Sheets

METHOD OF AND APPARATUS FOR RETRIEVING INFORMATION AND STORAGE MEDIUM

TECHNICAL FIELD OF THE INVENTION

The present invention relates to a method of and an apparatus for retrieving information. The invention also relates to a storage medium containing a program for performing such a method. These techniques may be used in information management systems, such as information retrieval systems or "search engines", information filtering applications also known as information routing systems, and information extraction applications.

DESCRIPTION OF THE RELATED ART

D.A. Hull and G. Greffenstette, "Querying across Languages: a Dictionary-Based Approach to Multilingual Information Retrieval", 19th Annual International Conference on Research and Development in Information Retrieval (SIGIR '96), pages 49–57, 1996, discloses a dictionary-based approach to cross-linguistic retrieval. In order to search for documents containing information of relevance to a chosen topic, a query is formulated by the searcher. A typical query comprises a short item of text, such as a sentence, which indicates the subject matter to be located. A document collection in the same language may then be searched by looking for matches between at least some of the words of the query and the full text of each document.

In order to search documents in a different "target" language from the "source" language of the query, the dictionary-based approach looks up the query terms in a bilingual dictionary. All possible translations of each source language query term are used to form a query in the target language and the matching process is then performed in the target language.

This technique therefore allows a searcher to formulate a query in a language which is different from the language of the documents to be searched.

In known cross-linguistic retrieval systems employing query translation techniques, all terms (words and collocations) of the query are translated into the target language and either all possible translations of each query term are used or one deterministically preferred translation of each term is used to form the target language query. However, both of these approaches have disadvantages.

Selecting all possible translations of source language query terms may lead to the retrieval of many documents which are not relevant to the query. This is because source language words have different meanings in different contexts and, based on these, have different preferred translations. Given the large number of documents available in typical information systems, this may mean that it is difficult for a searcher to identify the documents needed among the large number of irrelevant documents which may be identified.

Use of only the preferred translation of each query term solves the problem of large numbers of documents. However, known machine translation systems are of limited accuracy and would frequently select an inappropriate translation as the preferred translation. Thus, whenever the translation system selects the wrong translation, the information retrieval system is not very likely to identify documents which are relevant to the subject matter which is sought.

Techniques exist for analysing source language text to identify co-occurring words or collocations in an attempt to use contextual information in order to improve translation accuracy. Such a process aids the selection of sensible translations because there are fewer possible translations of a collocation than of its separate constituent words. For example, the collocation "make use of" has only a few translations into target languages whereas the frequently used terms "make", "use" and "of" give rise to a large number of translation terms.

Although using collocations assists in limiting the number of target language query terms which are generated, most known systems are only capable of recognising continuous collocations ie. words co-occurring next to each other. In practice, a substantial number of collocations in real languages are non-continuous. For example, the collocation "make use of" may occur in natural language documents as "make good use of", spanning the word "good" so as to be a non-continuous collocation.

EP 0 813 160 and GB 2 314 183 disclose a glosser for identifying and translating continuous and non-continuous collocations. A "glosser" enables an (ordered) plurality of source language words (or collocations) to be labelled with target language translations.

Another disadvantage of known arrangements of the type described hereinbefore is that identified documents are presented to the searcher in the target language. Thus, although a searcher who is unfamiliar with the target language can retrieve documents of relevance or interest in the target language, such a searcher cannot then check the relevance and content of retrieved documents unless he or she is familiar with the target language. Thus, although known techniques for cross-linguistic information retrieval may be used, the efficacy of such information retrieval can only be checked by searchers who have sufficient familiarity with the target language not to need to use such techniques.

GB 2 320 773 relates to an automatic translation technique which is principally intended for use on the Internet. It is based on searching by character strings for useful documents or files and selecting the most appropriate translation environment (such as a glosser or machine translation system) for located documents on the basis of the character string. Any translation which occurs is performed exclusively on located documents by the most appropriate translation environment for the subject matter as identified by the character string.

WO 97/18516 is specifically concerned with translating Web pages while preserving the original appearance. An HTML document is pre processed by placing notional barriers around the HTML codes so as to preserve them. The remaining text and data outside these barriers are then translated to the desired language. Finally, the barriers are removed so that the pages retain their original format or appearance but all relevant text is translated into the desired language. Queries are formulated conventionally in the usual address codes and undergo no processing but are merely used to access desired documents.

WO 97/08604 discloses an information retrieval system which is based on translating queries and documents. However, this technique makes use of a language-independent conceptual representation of each query and of each document which is available for searching. Thus, in order for the system to work, all documents must first be subjected to a "translation" procedure in which the conceptual representation of the document subject matter is formed. Queries are similarly processed and searching is performed by matching the conceptual representations.

SUMMARY OF THE INVENTION

According to a first aspect of the invention, there is provided a method of retrieving information from a plurality of documents in a target language using a query in a source language, comprising converting the query into the target language using a multilingual resource, forming a query in the target language from the converted query, applying the query in the target language to an information management system, and converting at least part of the or each document in the target language identified by the information management system into the source language using the multilingual resource.

A multilingual resource is any system which is capable of converting a term (word or collocation) in the source language into one or more equivalent terms in the target language. An information management system is any system which is capable of identifying documents containing terms which are applied to the system as a query.

The source and target languages are preferably natural languages.

The multilingual resource may be a bilingual glosser. The glosser may identify and translate each term of the source language query. The glosser may identify and translate terms which are collocations but may not translate the individual words of the collocations. For each term having more than one translation, the glosser may supply more than one of the translations.

The target language query may include at least some of any terms in the source language query which cannot be converted into the target language by the multilingual resource.

The at least part of each document may comprise a title of the document. The at least part of each document may comprise an abstract or abridgement of the document. The at least part of each document may comprise a sentence containing terms which match the query in the target language.

According to a second aspect of the invention, there is provided an apparatus for retrieving information from a plurality of documents in a target language using a query in a source language, characterised by comprising a multilingual resource for converting the query into the target language, means for forming a query in the target language from the converted query, and means for applying the query in the target language to an information management system, the multilingual resource being arranged to convert at least part of the or each document in the target language identified by the information management system into the source language.

The multilingual resource may be a bilingual glosser. The glosser may be arranged to identify and translate each term of the source language query. The glosser may be arranged to identify and translate terms which are collocations but not to translate the individual words of the collocations. For each term having more than one translation, the glosser may be arranged to supply more than one of the translations.

The query forming means may be arranged to include in the target language query at least some of any terms in the source language query which cannot be converted into the target language by the multilingual resource.

The apparatus may comprise a programmed data processor.

According to a third aspect of the invention, there is provided a storage medium characterised by containing a program for controlling a data processor of such an apparatus.

The glosser is preferably of the type disclosed in EP 0 813 160 and GB 2 314 183, the contents of which are incorporated herein by reference.

It is thus possible to perform cross-linguistic information retrieval in such a way that retrieved documents can be examined for relevance by a searcher who is unfamiliar with the target language of the documents. An advantage of using the same multilingual resource for forming a query and for converting into the source language at least part of the or each identified document is that the terms of the converted document or part thereof in the source language are likely to be the same as or similar to the terms used in the source language query. Thus, a searcher who is unfamiliar with the target language can determine with higher precision whether identified target language documents are indeed relevant to the query. The efficacy of cross-linguistic retrieval may therefore be substantially improved irrespective of whether a searcher is familiar with the target language.

An advantage of using a non-deterministic glosser such as that disclosed in EP 0 813 160 and GB 2 3 14 183 is that it generates a preferred translation for each term but also generates a variety of alternative translations, for instance using contextual information in a sentence where available. This considerably limits the number of alternative translations generated. Also, alternative translations may be ranked according to a criterion indicating the likelihood of each translation being correct. Thus, the number of translations actually used in target-language query formulation may be adjusted to the requirements of a searcher.

DESCRIPTION OF THE DRAWINGS

The invention will be further described, by way of example, with reference to the accompanying drawings, in which.

DETAILED DESCRIPTION OF THE INVENTION

Figure 1:
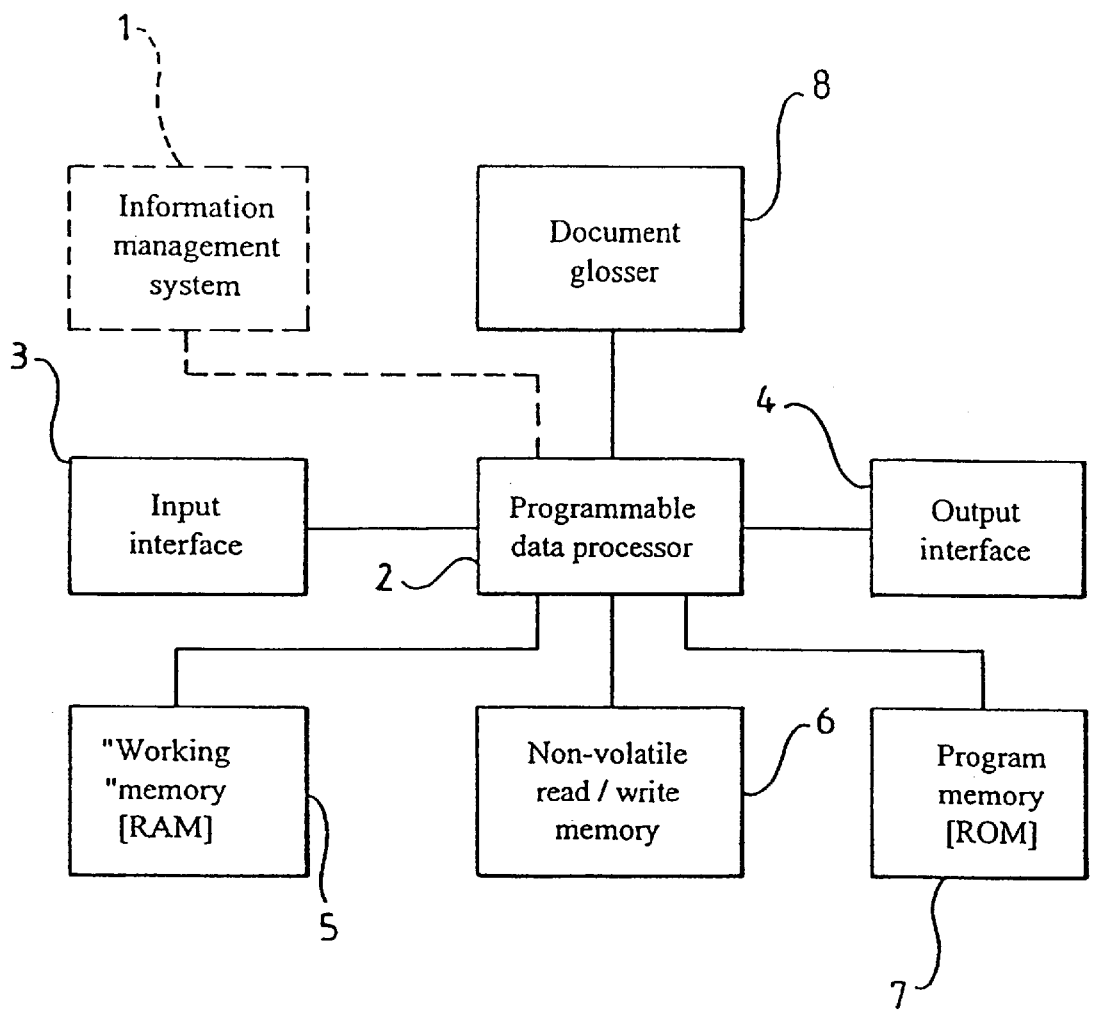
FIG. 1 is a block schematic diagram of an apparatus for retrieving information constituting an embodiment of the invention.

FIG. 1 shows an apparatus for retrieving information using an information management system 1, such as an Internet search engine. The apparatus is of the programmed data processor type, such as a computer, and comprises a programmable data processor 2 provided with an input interface 3, such as a keyboard and mouse, and an output interface 4, such as a display and printer. The input interface 3 may be used for entering source language queries and for otherwise controlling operation of the apparatus. The output interface 4 may be used for displaying the results of searches and for providing information about operation of the apparatus.

The data processor 2 has a "working memory" in the form of random access memory (RAM) 5 for temporarily storing data during data processing. A non-volatile read/write memory 6 is provided for storing data which are required to be retained, for instance, when the power supply to the apparatus is switched off. A program memory 7 in the form of a read only memory (ROM) contains a program for controlling operation of the data processor 2. The apparatus further comprises a document glosser 8 which labels the terms (words and collocations) of the source language query with target language translations. The glosser 8 is preferably of the type disclosed in EP 0 813 160 and GB 2 314 183. Although the glosser 8 is illustrated as an independent component of the apparatus, it may be embodied by the data processor 2 and the memories 5 to 7.

The program memory 7 contains the aforementioned program which is executed by the data processor 2 and/or the document glosser 8 included therein in order to carry out the various operations described herein. The program may be written in any of a variety of known computer languages as will be readily apparent to those having ordinary skill in the art of computer programming. Hence, further detail regarding the specific code itself has been omitted for the sake of brevity.

The information management system 1 is of the type which contains machine-readable documents and which is arranged to access or search for such documents on the basis of queries. In particular, the system 1 receives queries from the apparatus and searches the documents for matches with the queries. Documents containing the terms or logical combinations of the terms of each query are then made available to the apparatus, for instance by down-loading into the memory 5. In order to provide sufficient memory capacity, the memory 5 may include disc drives of the magnetic or optical storage type.

Figure 2:
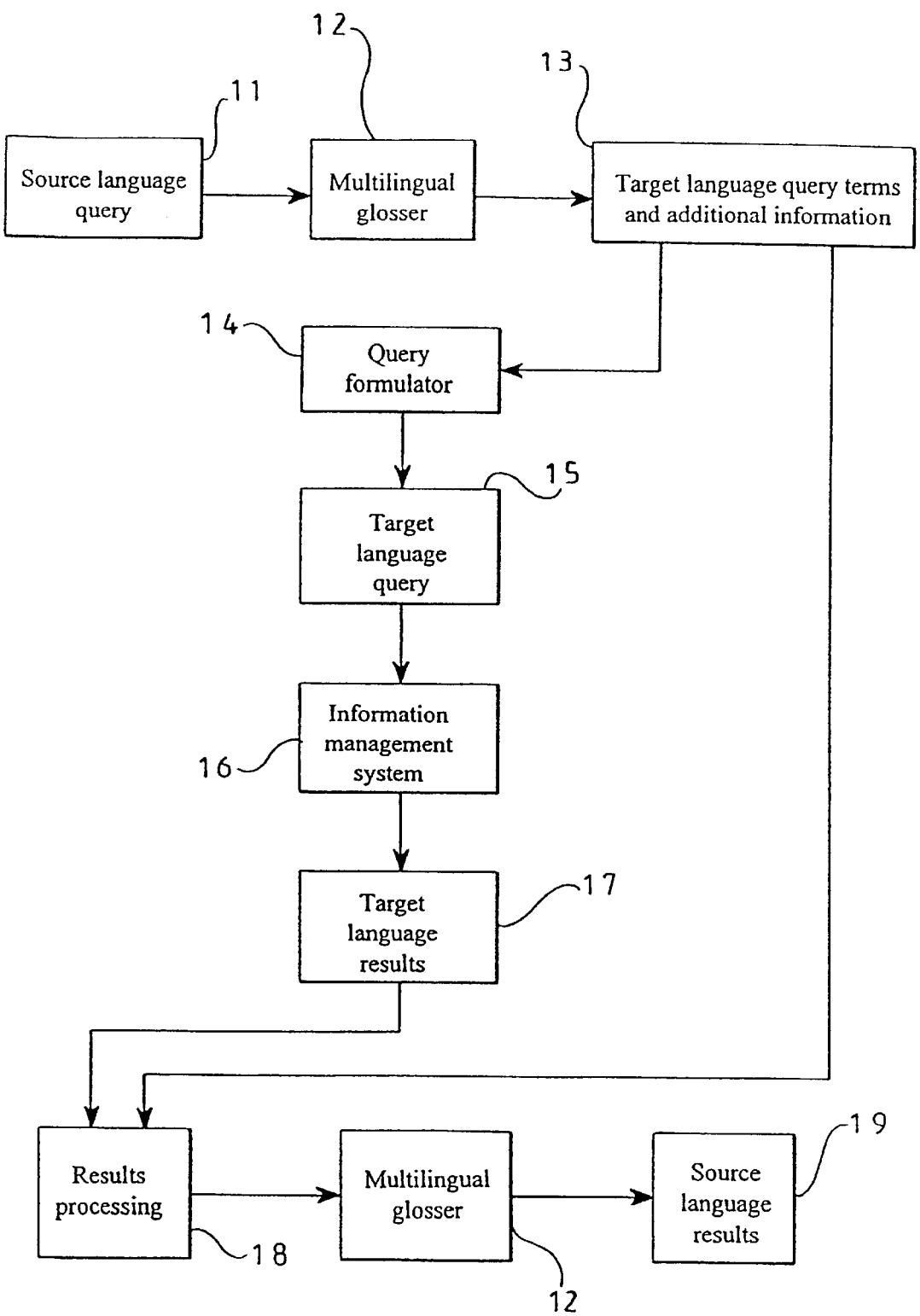
FIG. 2 is a flow diagram illustrating a method of retrieving information constituting an embodiment of the invention.

FIG. 2 illustrates a method of retrieving information which may be performed by the apparatus shown in FIG. 1. A source language query, for example in English, is formulated at 11, for instance, by being entered on a keyboard of the input interface 3. The source language query is applied to a multilingual glosser 12 which corresponds to the document glosser 8 shown in FIG. 1. In the example described hereinafter, the multilingual glosser 12 converts between English and Dutch terms and is of the type disclosed EP 0 813 160 and GB 2 314 183.

The glosser 12 converts the terms of the source language query into target language query terms as indicated at 13. The glosser 12 supplies additional information indicating the likelihood or probability of each of several target language query terms of a source language query term being the correct one.

The target language query terms and the additional information are supplied to a query formulator 14 which converts the terms into a target language query 15. The query formulator 14 uses the additional information, for instance to ignore each target language query term whose probability of being correct is less than a threshold. The target language query 15 is in a form which may be applied direct to an information management system 16, such as an Internet search engine.

The information management system 16 performs a matching process. In particular, the system 16 searches the target language documents for matches between the target language query and the text of the documents. Whenever a match is found, the document is down-loaded as a target language result 17. The results are then processed at 18 using the additional information provided by the glosser 12, for instance to re-rank the results. The results which are returned and which contain "most likely" query term translations may be placed higher in a ranked list of results than those containing a target language query term generated from a less likely translation alternative. A specific example illustrating such re-ranking is described hereinafter.

The processed target language results in the form of processed target language documents are then supplied to the multilingual glosser 12, which converts the target language results to source language results 19, which are then presented to the user, for instance on a display or as hard copy from a printer in the output interface 4. The multilingual glosser 12 may provide a gloss translation of the whole of each target language document or may provide a translation of only part thereof, such as a title, abstract or abridgement.

Figure 3:
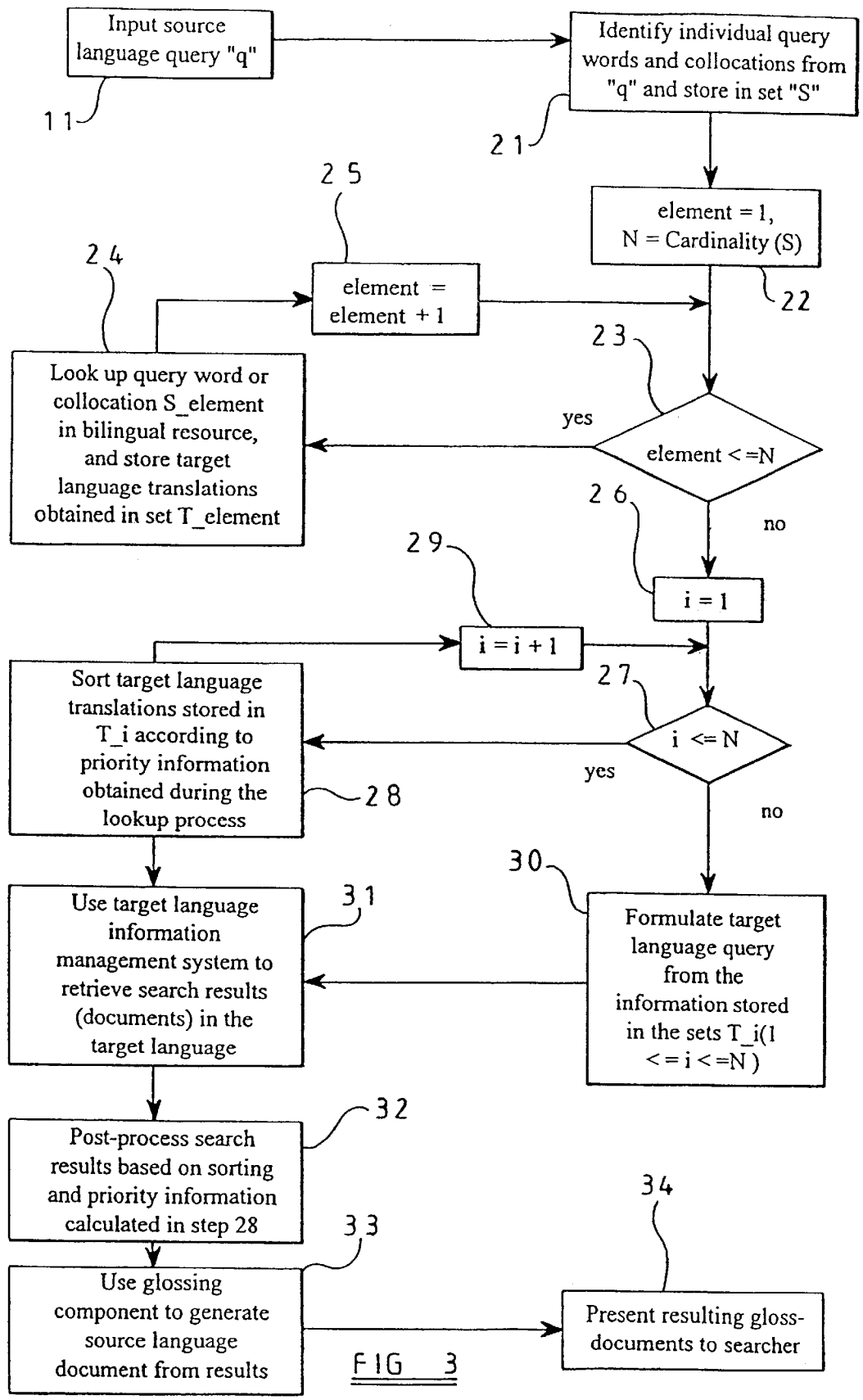
FIG. 3 is a more detailed flow diagram of a method similar to that illustrated in FIG. 2.

FIG. 3 illustrates part of the method shown in FIG. 2 in more detail. The use of the method will be described with reference to a specific but arbitrary source language query in English for accessing documents in Dutch.

The input source language query q shown at 11 is applied to the English/Dutch glosser, which is of the type disclosed in EP 0 813 160 and GB 2 314 183. The information management system 16 is, in this example, a Dutch World Wide Web search engine. The source language query is "treatments for athlete's foot".

In a step 21, the glosser identifies the individual terms of the query, which terms may be words, non-continuous collocations and continuous collocations, and stores these terms in a set S. The specific query is converted into the set of terms:

treatments for athlete foot athlete's foot.

A step 22 sets a parameter "element" to a value of 1 and a parameter N to the cardinality of the set S ie. a value equal to the number of elements of the set S which, in the specific example, is 5. A step 23 tests whether "element" is less than or equal to N. If so, a step 24 looks up the query term $S_{element}$ in a bilingual resource, such as an English/Dutch dictionary or lexicon, and stores the or each target language translation in a set $T_{element}$. A step 25 increments the parameter "element" by one and the steps 23 to 25 are repeated until all of the query terms have been translated.

A step 26 sets a parameter i to a value of one and a step 27 tests whether i is less than or equal to N. If so, a step 28 sorts the target language translations stored in the set $T_i$ according to priority information obtained during the look up process performed in the step 24. Where the set $T_i$ contains only one translation, no processing is necessary. However, where the set $T_i$ contains more than one possible translation, the translations are sorted in order of the likelihood of being correct.

The parameter i is incremented by one in the step 29 and the steps 27 to 29 are repeated until all of the target language translations of the input source language query terms have been sorted. For example, in the case of the specific input query, the results are as follows:

| treatments | -> | {behandelingen} |
|---|---|---|
| for | -> | {voor} |
| athlete | -> | {atleet} |
| foot | -> | {voet, basis} |
| athlete's foot | -> | {voetschimmel} |

In a step 30, the sorted target language translations in sets $T_i$, where $1 \leq i \leq N$, are formulated into a target language query. An example of a target language query is as follows:

behandelingen AND voor AND (voetschimmel OR (atleet AND (voet OR basis))).

The query formulator 14 detects that the source language query terms "treatments" and "for" have single Dutch translations and must be present in any document of relevance. Accordingly, the query formulator 14 formulates the query with the translations for these terms related by the Boolean logic AND operator.

The query formulator 14 detects that there are various possible translations for the remaining terms of the source language query. In particular, the translations for the individual words "athlete" and "foot" would both have to be present in a relevant document but an alternative to this would be the presence of the translation for the term "athlete's foot". Further, the formulator detects that there are two possible translations of the term "foot" so that these should be defined as alternatives in the query. Alternatives are related by the Boolean logic OR operator in the query.

The query is applied to the target language information management system in a step 31, which retrieves the search results in the form of documents in the target language. For instance, the step 31 returns the titles of relevant documents or passages from such documents in which the necessary combinations of the terms in the target language query are present. An example of the result of such a search is as follows:

1. Moderne behandelingen voor voetschimmel
2. Voetschimmel: nieuwe behandelingen voor een oude kwaal
3. Behandelingen voor aandoeningen van de atleet op basis van nieuwe medische vindingen.

A step 32 then processes the search results based on sorting and priority information calculated in the step 28 and a specific example of this is described hereinafter.

A step 33 then supplies the search results in the target language to the glosser 12, which generates source language documents or text from these results. Thus, the target language search results given hereinbefore are translated by the glosser, which gives the following result:

1. Modern treatments for athlete's foot
2. Athlete's foot: new treatments for an old problem
3. Treatments for injuries of athletes based on new medical discoveries.

The order of the documents reflects the priority information in that the document considered most relevant is presented as the first document. In the specific example, the first two documents are clearly relevant as they contain the preferred glossing translations of the terms of the source language query. However, by using a limited number of less-preferred translations, the chances of missing a relevant document are reduced whereas the number of irrelevant documents located is also reduced. In the specific example, a single irrelevant document has been located.

In the specific example described hereinbefore, the glosser was required to identify only a single continuous collocation in addition to the individual words of the source language query. However, the glosser disclosed in EP 0 813 160 and GB 2 314 183 is also capable of identifying non-continuous collocations. A specific example of such a non-continuous collocation occurs in the query: "making good use of old clothes".

In this case, the words "making use of" constitute a non-continuous collocation spanning the word "good". By detecting such non-continuous collocations, it is possible to improve the precision of translating the query into the target language.

In this case, the steps 20 to 28 provide the following sets of sorted target language translations of the source language query:

| make us of | -> | {gebruiken, ... } |
| good | -> | {goed, goedaardig, ... } |
| old | -> | {oud, antiek, ... } |
| clothes | -> | {kleren, kledingstukken, ... } |

These sets do not contain translations of the individual words "make", "use" and "of" so that a large number of possibly irrelevant senses of the constituent terms of the collocation "make use of" are eliminated. This in turn substantially reduces the likelihood of irrelevant documents being found because of the use of inappropriate target language terms in the target language query.

To illustrate the processing performed in the step 32, a source language query "introducing security passes" is considered. The Dutch language translations of "passes" and their probabilities of being correct are given as:

| passes | → | pas(sen) | (0.7) |
| | | kaart(en) | (0.2) |
| | | voldoende(s) | (0.1) |

A query generated from these alternatives (and of course those of the other terms) returns the following sets of results:

1. Het halen van voldoendes op school: zijn voldoendes echt voldoende?
    (in English: "Getting pass marks in school: is a pass really good enough?")
2. Veiligheid op kantoor: passen en beveiligingsbeambten.
    (in English: "Safety in the office: passes and security guards").
3. Een pas opent alle deuren.
    (in English: "One pass opens all doors").

Now even though "passen" is by far the most likely query term translation, a document containing the least likely one has been ranked highest. This is because it contains a translation of the English term "passes" more frequently (it has three matches with the query instead of one), and the search engine uses this as an ordering criterion. Given the extra information available, this is not the desired behaviour. Using the extra information, the results are re-ranked based on the likelihood of the translation alternatives. In the simplest case, for example, the formula: "number of occurrences of the terms in the document" times "likelihood of the term" may be applied. In the example, therefore, the first document receives a new score of only 0.3 (3×0.1), whereas the next two receive a score of 0.7 (1×0.7) each. Therefore, the new ranking is:

1. Veiligheid op kantoor: passen en beveiligingsbeambten.
2. Een pas opent alle deuren.
3. Het halen van voldoendes in school: zijn voldoendes echt voldoende?

which is more in line with the information about the likelihoods of the translation alternatives being correct.

In practice, there may be many examples of source language query terms which cannot be translated by the multilingual resource into target language query terms. A common example of this is where queries contain proper names. For example, it is unlikely that the multilingual resource would be able to translate proper names such as "Dagmar Dwehus". However, such query terms may be very useful in retrieving relevant documents, for example where it is desired to retrieve only documents containing such a proper name.

In order to deal with this situation, it is possible for terms for which the multilingual resource cannot find a translation to be passed without change into the target language query. Such terms may then be used in the target language query so that either: only documents containing such terms are retrieved; or documents containing such terms and documents not containing such terms but fulfilling other search criteria are retrieved.

As an alternative, such "untranslatable" terms may be edited during the formulation of the target language query. For example, such terms may be carried over into the target language query only if they are identified as proper names. Thus, terms which are not identified as proper names are rejected and do not form part of the target language query. This technique is useful in rejecting terms which are untranslatable because they have been misspelled in the source language query.

When deciding on a strategy for formulating target language queries, it may be necessary to consider the actual form of the multilingual resource. For example, machine translation systems may generate target language query terms which are quite rare whereas glossers might generate more common terms. It is believed that this may have an effect on the overall retrieval accuracy.

For example, one effect of this may be that, because information retrieval systems are often statistical in nature, more common terms may be allowed to contribute fewer documents to a retrieval system so as to leave more room for other terms to contribute documents. Thus, if a target language query term was an incorrect translation, it would have less of a negative effect of the retrieval results. In contrast, systems using more rare terminology may be punished more heavily for mistakes in the translation process because the rarity of a resulting term may mean that it is given greater importance in the retrieval system and thus can contribute more potentially irrelevant documents to the result.

It is believed that use of the most commonly used terms in the target language query may help to retrieve a larger number of potentially relevant documents. It is believed that such a technique may not result in too many relevant documents being retrieved because the fact that the term is common is a clue to the information retrieval system that its value in distinguishing relevant documents from non-relevant ones is probably quite low.

Depending on the nature of the multilingual resource, it may be sufficient to select a "default translation" of the each source language term so as to form the equivalent target language term. For example, where the multilingual resource is a bilingual dictionary, this default translation may be the preferred translation obtained from the dictionary. Where information has been obtained on the frequency of occurrence of a term, for example by analysing a large number of documents, the most common term may be selected as the default translation.

What is claimed is:

1. A method for retrieving information from a plurality of documents in a target language using a query in a source language, including the steps of:
   converting the query into the target language using a multilingual resource,
   forming a query in the target language from the converted query and additional information on the target language, the additional information on the target language including information indicating a likelihood or probability of a converted query term in the target language being a correctly converted term,
   applying the query in the target language to an information management system which identifies a plurality of documents in the target language based on the query,
   using the additional information on the target language to re-rank the plurality of documents identified by the information management system according to a degree of relevance, and
   converting at least part or all of at least one of the plurality of documents in the target language identified by the information management system into the source language using the multilingual resource.

2. A method according to claim 1, wherein the source and target languages are natural languages.

3. A method according to claim 1, wherein the multilingual resource is a bilingual glosser.

4. A method according to claim 3, wherein the glosser identifies and translates each term of the source language query.

5. A method according to claim 4, wherein the glosser identifies and translates terms which are collocations but does not translate the individual words of the collocations.

6. A method according to claim 4, wherein, for each term having more than one translation, the glosser supplies more than one of the translations.

7. A method according to claim 1, wherein the target language query includes at least some of any terms in the source language query which cannot be converted into the target language by the multilingual resource.

8. A method according to claim 1, wherein the at least part of each document comprises a title of the document.

9. A method according to claim 1, wherein the at least part of each document comprises an abstract or abridgement of the document.

10. A method according to claim 1, wherein the at least part of each document comprises a sentence containing terms which match the query in the target language.

11. An apparatus for retrieving information from a plurality of documents in a target language using a query in a source language, comprising:
    a multilingual resource for converting the query into the target language,
    means for forming a query in the target language from the converted query and additional information on the target language, the additional information on the target language including information indicating a likelihood or probability of a converted query term in the target language being a correctly converted term, and
    means for applying the query in the target language to an information management system which identifies a plurality of documents in the target language based on the query,
    means for using the additional information on the target language to re-rank the plurality of documents identified by the information management system according to a degree of relevance,
    wherein the multilingual resource is arranged to convert at least part or all of at least one of the plurality of documents in the target language identified by the information management system into the source language.

12. An apparatus according to claim 11, wherein the source and target languages are natural languages.

13. An apparatus according to claim 11, wherein the multilingual resource is a bilingual glosser.

14. An apparatus according to claim 13, wherein the glosser is arranged to identify and translate each term of the source language query.

15. An apparatus according to claim 14, wherein the glosser is arranged to identify and translate terms which are collocations but not to translate the individual words of the collocations.

16. An apparatus according to claim 14, wherein, for each term having more than one translation, the glosser is arranged to supply more than one of the translations.

17. An apparatus according to claims 11, wherein the query forming means is arranged to include in the target language query at least some of any terms in the source language query which cannot be converted into the target language by the multilingual resource.

18. An apparatus according to claim 11, wherein the at least part of each document comprises a title of the document.

19. An apparatus according to claim 11, wherein the at least part of each document comprises an abstract or abridgement of the document.

20. An apparatus according to claim 11, herein the at least part of each document comprises a sentence containing terms which match the query in the target language.

21. An apparatus according to claim 11, further comprising a programmed data processor.

22. A storage medium containing a program for controlling a programmed data processor of an apparatus for retrieving information from a plurality of documents in a target language using a query in a source language, the apparatus comprising:

a multilingual resource for converting the query into the target language, means for forming a query in the target language from the converted query and additional information on the target language, the additional information on the target language including information indicating a likelihood or probability of a converted query term in the target language being a correctly converted term, and means for applying the query in the target language to an information management system which identifies a plurality of documents in the target language based on the query, means for using the additional information on the target language to re-rank the plurality of documents identified by the information management system according to a degree of relevance, wherein the multilingual resource is arranged to convert at least part or all of at least one of the plurality of documents in the target language identified by the information management system into the source language.

* * * * *